(12) United States Patent
McEwan

(10) Patent No.: US 7,677,040 B2
(45) Date of Patent: *Mar. 16, 2010

(54) TURBOCHARGER WITH WASTEGATE

(75) Inventor: James A. McEwan, Brighouse (GB)

(73) Assignee: Holset Engineering Company Limited, Huddersfield (GB)

( * ) Notice: Subject to any disclaimer, the term of this patent is extended or adjusted under 35 U.S.C. 154(b) by 683 days.

This patent is subject to a terminal disclaimer.

(21) Appl. No.: 10/723,172

(22) Filed: Nov. 26, 2003

(65) Prior Publication Data

US 2005/0050888 A1 Mar. 10, 2005

Related U.S. Application Data

(63) Continuation of application No. 09/361,612, filed on Jul. 27, 1999, now Pat. No. 6,658,846.

(30) Foreign Application Priority Data

Jul. 27, 1998 (GB) .................................. 9816275.3

(51) Int. Cl.
*F02B 33/44* (2006.01)
*F01B 19/00* (2006.01)
*F16J 3/00* (2006.01)
*F01B 9/00* (2006.01)

(52) U.S. Cl. .......................... 60/602; 92/94; 92/130 A; 92/140

(58) Field of Classification Search ........... 60/600–603; 92/94, 140, 130 A; 403/157; 188/52; 239/265.41; 139/265.41

See application file for complete search history.

(56) References Cited

U.S. PATENT DOCUMENTS

| 2,861,774 | A |   | 11/1958 | Buchi ........................... 60/602 |
| 4,060,152 | A |   | 11/1977 | Bogenschutz et al. ......... 188/52 |
| 4,256,019 | A | * | 3/1981  | Braddick ..................... 60/602 |
| 4,377,070 | A |   | 3/1983  | Shadbourne ................. 60/602 |
| 4,549,470 | A |   | 10/1985 | Yogo ............................... 92/94 |
| 4,766,980 | A |   | 8/1988  | Engle ......................... 403/157 |
| 4,994,660 | A | * | 2/1991  | Hauer ................... 239/265.41 |
| 5,033,592 | A | * | 7/1991  | Metzelfeld ................ 92/130 A |
| 5,159,815 | A |   | 11/1992 | Schlamadinger ............. 60/603 |
| 5,186,004 | A | * | 2/1993  | Gautier et al. ................ 92/140 |
| 5,487,273 | A |   | 1/1996  | Elpern et al. .................. 60/602 |
| 5,746,058 | A |   | 5/1998  | Vertanen ....................... 60/602 |
| 5,755,101 | A |   | 5/1998  | Free et al. ..................... 60/602 |

FOREIGN PATENT DOCUMENTS

| GB | 2 033 007 | 5/1980 | .................. 60/602 |
| GB | 2 066 365 | 7/1981 | .................. 60/602 |
| JP | 357052635 | 3/1982 | .................. 60/602 |

* cited by examiner

*Primary Examiner*—Thai Ba Trieu
(74) *Attorney, Agent, or Firm*—Krieg DeVault LLP; J. Bruce Schelkopf, Esq.

(57) ABSTRACT

An actuator rod (17) for a turbocharger pressure control assembly comprises a first elongate portion (17a) defining a first rod end and a second portion (17b) defining a second rod end. The first and second portions are pivotally joined to one another to allow a degree of relative pivotal motion therebetween in at least one plane perpendicular to the axis of said elongate first portion (17a).

17 Claims, 3 Drawing Sheets

TURBOCHARGER WITH WASTEGATE

The present application is a continuation of U.S. patent application No. 09/361,612 filed Jul. 27, 1999 now U.S. Pat. No. 6,658,846, which is incorporated herein by reference.

FIELD OF THE INVENTION

This invention relates to a turbocharger incorporating a wastegate and wastegate actuator, and in particular relates to the manner in which the actuator is connected to the wastegate.

BACKGROUND OF THE INVENTION

Turbochargers are well known devices for supplying air to the intake of an internal combustion engine at pressures above atmospheric (boost pressures), and are widely used in automobiles and the like. A conventional turbocharger essentially comprises an exhaust gas driven turbine wheel mounted on a rotatable shaft within a turbine housing. For instance, in a centripetal turbine the turbine housing defines an annular inlet passageway around the turbine wheel and a generally cylindrical axial outlet passageway extending from the turbine wheel. Rotation of the turbine wheel drives a compressor wheel mounted on the other end of the shaft within a compressor housing. The compressor wheel delivers compressed air to the intake manifold of the engine, thereby increasing engine power.

It is also well known to provide turbochargers with a bypass passageway between the exhaust inlet and the exhaust outlet portions of the turbine housing to enable control of the turbocharger boost pressure. A wastegate valve is located in the passageway and is controlled to open the passageway when the pressure level of the boost air increases to a predetermined level, thus allowing some of the exhaust gas to bypass the turbine wheel preventing the boost pressure from rising further. The wastegate valve is generally actuated by a pneumatic actuator operated by boost air pressure delivered by the compressor wheel.

The conventional pneumatic actuator comprises a spring loaded diaphragm housed within a canister (the wastegate actuator can) which is mounted to the compressor housing. The diaphragm acts on a connecting rod which actuates the wastegate valve assembly which is mounted in the turbine housing.

The actuator can is connected to the compressor outlet by a flexible hose to deliver boost air to the can which acts on the diaphragm to oppose the spring bias. The spring is selected, and the actuator and wastegate valve initially set, so that under low boost conditions the wastegate valve remains closed. However, when the boost pressure reaches a predetermined maximum the diaphragm is moved against the action of the spring and operates to open the wastegate valve (via the connecting rod and linking arm) thereby allowing some exhaust gas to bypass the turbine wheel.

In conventional arrangements the wastegate valve is mounted on a valve stem which extends through the turbine housing and which is rotated to open and close the valve. Rotation of the valve stem is achieved by the reciprocal motion of the actuator rod (as the spring loaded diaphragm moves back and forth within the actuator canister) via a lever arm which links the end of the actuator rod to the valve stem. To accommodate the motion of the actuator rod, there is a pivotable joint between the lever arm and the actuator rod, the opposite end of the lever arm being secured (typically by welding) to the end of the valve stem. For accurate operation of the actuator it is also important that the diaphragm maintains alignment within the canister, and thus that the rod maintains its alignment along the axis of the canister. It is therefore known to design the pivotal joint between the actuator rod and the lever arm to allow a slight amount of movement along axis of the lever arm to limit the tendency of the actuator rod to be pulled off-line as it reciprocates.

It will be appreciated that the pressure at which the wastegate valve begins to open, known as the "lift off point", is critical and must therefore must be very carefully set when the actuator and wastegate are assembled to the turbocharger. With the conventional actuator assembly described above, initial set up is achieved by a process known as "weld to set". The actuator canister, actuating rod, and the lever arm are pre-assembled, and mounted to the turbocharger. The wastegate valve is then clamped shut from within the turbine housing and the actuator canister is pressurised to the desired lift off pressure. With the diaphragm, actuator rod, and valve thus held in their respective relative positions immediately prior to lift off, the end of the lever arm is welded to the valve stem. Accordingly, any increase in the pressure supply to the actuator above the predetermined lift off pressure will cause the valve to open.

It will be appreciated that the pressure at which the diaphragm of the actuator begins to move is dependent upon the spring rate. Because tolerances to which springs can practically be manufactured mean that there can be variations in spring rate from one spring to the next, it is conventional to employ an adjustable length actuator rod to enable the length of the rod to be adjusted prior to welding the lever arm to the valve stem to ensure that the actuator rod and diaphragm are in proper alignment with the actuator canister at the lift off point.

The steps involved in the weld to set process can therefore be summarised as: holding the valve member in a closed position; pressurising the actuator canister to the lift off pressure; adjusting the length of the actuator rod; and then welding the end of the lever arm to the valve stem.

OBJECT OF THE INVENTION

It is an object of the present invention to provide a novel design of actuator rod and lever arm, and a novel method for setting the lift off point of the wastegate valve.

SUMMARY OF THE INVENTION

According to a first aspect of the present invention there is provided an actuator rod for a turbocharger pressure control assembly, the actuator rod comprising a first elongate portion defining a first rod end, and a second portion defining a second rod end, said first and second portions being pivotally joined to one another to allow a degree of relative pivotal motion between said two portions in at least one plane perpendicular to the axis of said elongate first portion.

The pivotal joint between said first and second portions preferably allows pivotal motion in at least two orthogonal planes perpendicular to the axis of said first elongate portion. For instance, the pivotal joint is preferably a spherical joint.

According to a second aspect of the present invention there is provided a turbocharger including a pressure control assembly comprising a pneumatic actuator, a valve assembly, and an actuating rod according to any preceding claim one end of which is connected to the actuator and the other end of which is connected to the valve assembly, whereby the pneumatic actuator controls operation of the valve assembly via the actuator rod.

According to a second aspect of the present invention there is provided a method of assembling a pressure control assembly of a turbocharger, the turbocharger comprising a turbine housing and a compressor, the pressure control assembly comprising a valve assembly mounted within the turbine housing, a pneumatic actuator mounted to the turbocharger to receive pressurised air from the compressor, an actuator rod extending from the pneumatic actuator, and a lever arm extending from the valve assembly and the turbine housing and linking the actuator rod to the valve assembly, wherein the actuator rod comprises a first elongate portion defining a first rod end and a second portion defining a second rod end, the first and second portions being pivotally joined to one another to allow a degree of relative pivotal motion between said two portions in at least one plane perpendicular to the axis of the elongate first portion, the method comprising:

assembling the valve assembly and lever arm on the turbine housing;

assembling the pneumatic actuator and actuator rod as a sub-assembly;

mounting the pneumatic actuator/actuating rod sub-assembly to the turbocharger; and securing the second portion of the actuator rod to the lever arm.

The actuator rod is preferably secured to the lever arm by welding or otherwise bonding.

Preferably prior to securing the actuator rod to the lever arm, the valve assembly is held in a closed position by appropriate clamping of the lever arm and said pneumatic actuator is pressurised to a predetermined pressure, thereby to determine the minimum pressure at which said valve will in use begin to open.

BRIEF DESCRIPTION OF THE DRAWINGS

A specific embodiment of the present invention will now be described, by way of example only, with reference to the accompanying drawings, in which.

DETAILED DESCRIPTION OF THE PREFERRED EMBODIMENTS

Figure 1:
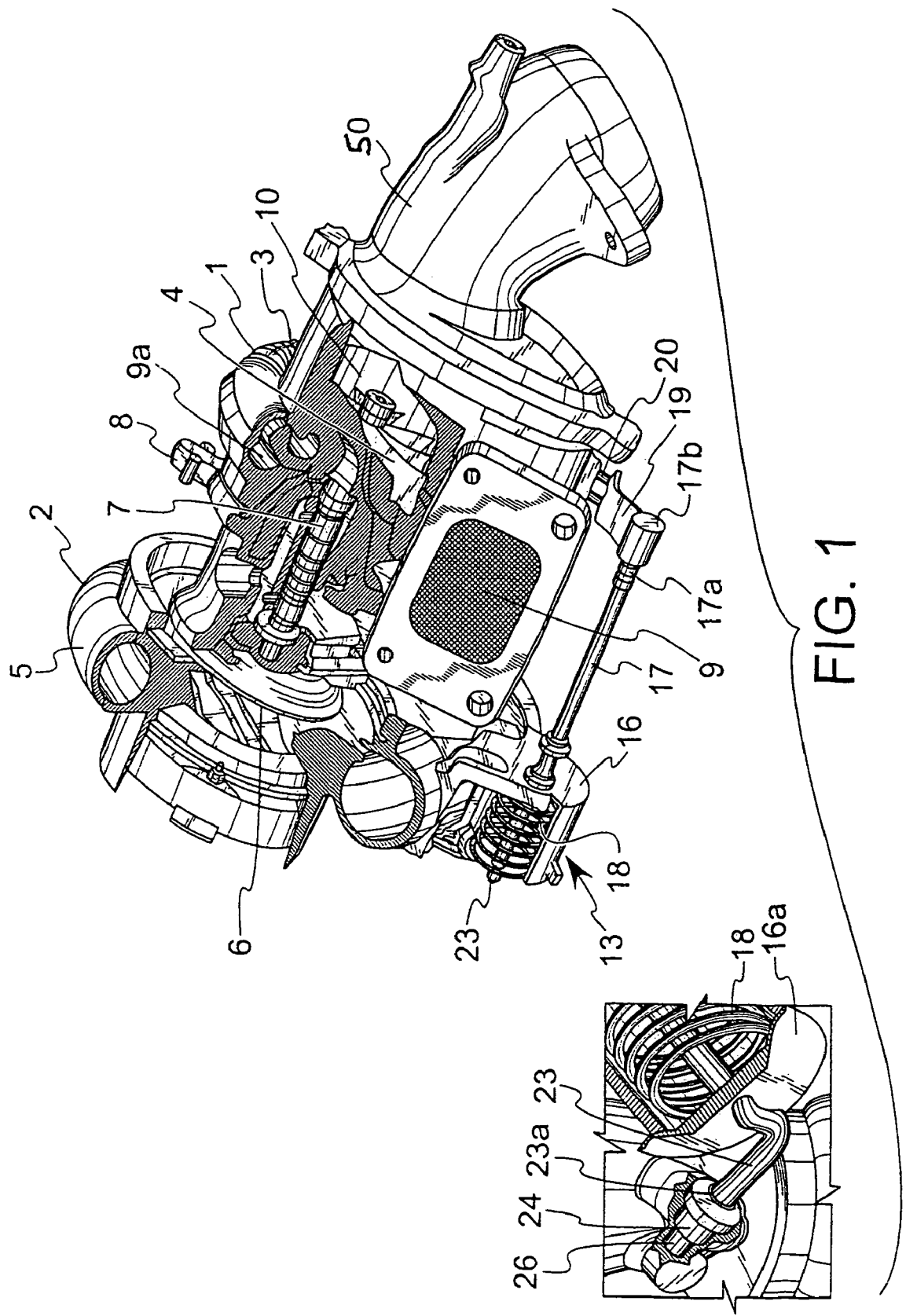
FIG. 1 is a partly cut-away perspective view of a turbocharger incorporating the present invention.

Referring to the drawings, the illustrated turbocharger is of a radial type, comprising a centripetal turbine indicated generally by the reference numeral 1 and a centrifugal compressor illustrated generally by the reference numeral 2. The turbine 1 comprises a turbine housing 3 which houses a turbine wheel 4. Similarly, the compressor 2 comprises a compressor housing 5 which houses a compressor wheel 6. The turbine wheel 4 and compressor wheel 6 are mounted on opposite ends of a common shaft 7. The turbine housing 3 and compressor housing 5 are joined together by a conventional circular V-band clamp 8.

The turbine housing 3 is provided with an exhaust gas inlet 9 and an exhaust gas outlet 10. The inlet 9 directs incoming exhaust gas to an annular inlet chamber which surrounds the turbine wheel 4. The exhaust gas flows through the turbine and into the outlet 10 via a circular outlet opening which is coaxial with the turbine wheel 4 and directs exhaust gas to an outlet pipe 50.

The turbine housing 3 also defines a bypass passageway 11 which communicates between the exhaust inlet 9 and the exhaust outlet 10 bypassing the turbine wheel 4. The bypass passageway 11 communicates with the exhaust inlet 9 via a circular opening which is closed by the valve member 12a of a wastegate valve 12 provided for controlling the flow therethrough.

Operation of the wastegate valve 12 is controlled by a spring loaded pneumatic actuator 13, which receives compressed air from the outlet volute 14 of the compressor 2. The actuator 13 comprises a diaphragm 15 mounted within a canister (the actuator can) 16 on one end of an actuating rod 17. The rod 17 extends from the front of the canister 16 towards the turbine housing 3 and the wastegate valve 12. The diaphragm 15 is biased towards the rear of the actuator can 16 by a coil spring 18 mounted coaxially around the actuator rod 17 and acting between the diaphragm 15 and the front end of the actuator can 16. The actuator can 16 is closed at its rear end by a cap 16a (which is crimped to the main body of the can). In the drawings the can 16 is cut-away to reveal details of the spring 18 and diaphragm 15; it will be appreciated however that the can 16 is actually a closed unit.

The compressor housing 5 is provided with a mounting bracket 25 for mounting the actuator 13, and a passageway 26 which communicates with the compressor outlet volute 14 and the end of the pipe 23. In the drawings, the compressor housing 5 is partly cut-away to show details of the passage 26 and connection of the pipe 23. The passageway 26 is provided with an enlarged diameter annular opening 26a to receive an O-ring 24 which seats on a flange 23a of the connecting pipe 23. The mounting bracket 25 comprises two forked arms 25a and 25b which define slots 27 to receive actuator mounting bolts 28 the shafts of which extend from the actuator can 16, the can 16 being fixed in position by nuts 30 threaded onto the bolts 28.

Figure 2:
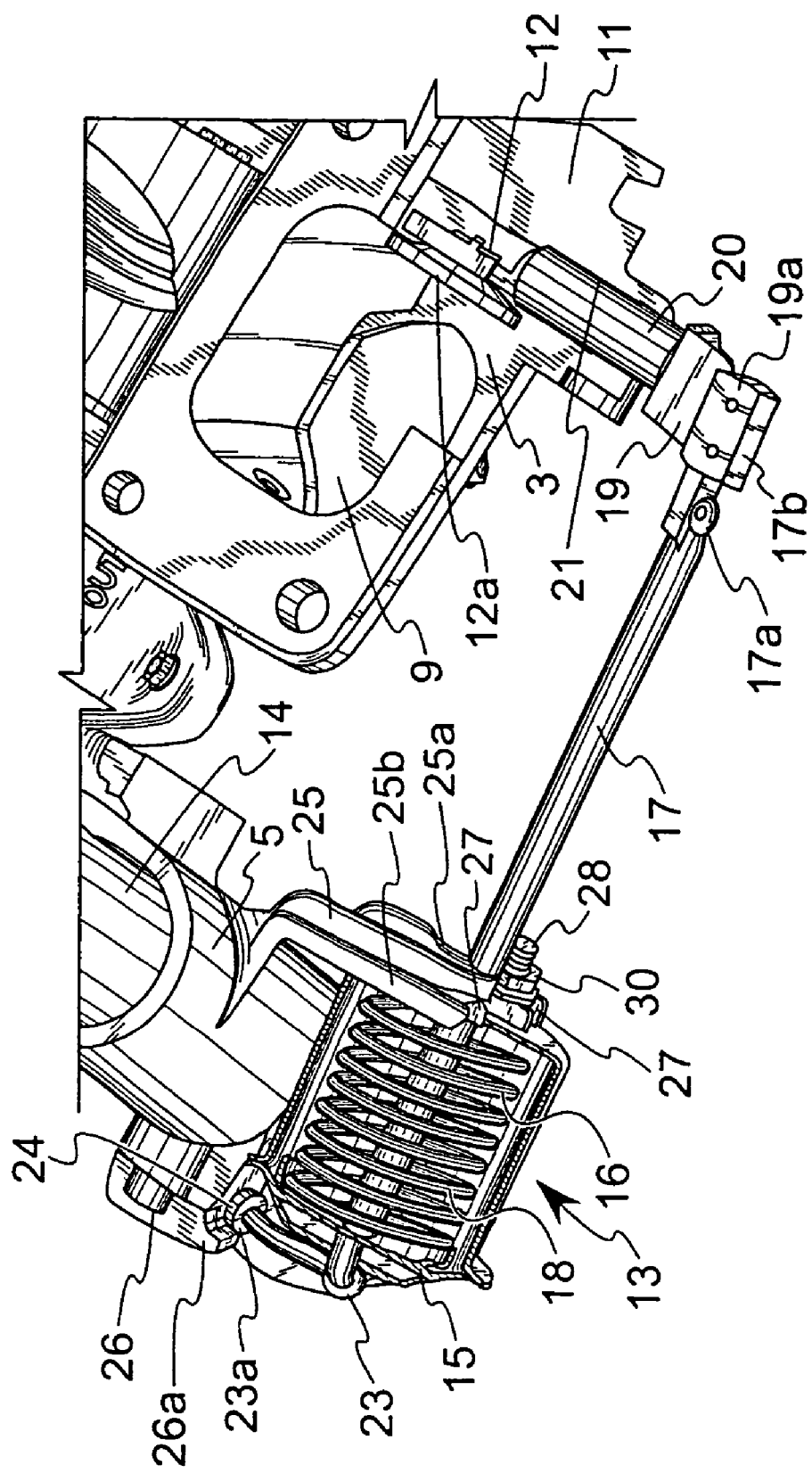
FIG. 2 is an enlargement of part of FIG. 1 viewed from a slightly different angle and partly cut-away to reveal details of the wastegate valve and actuator.
Figure 3:
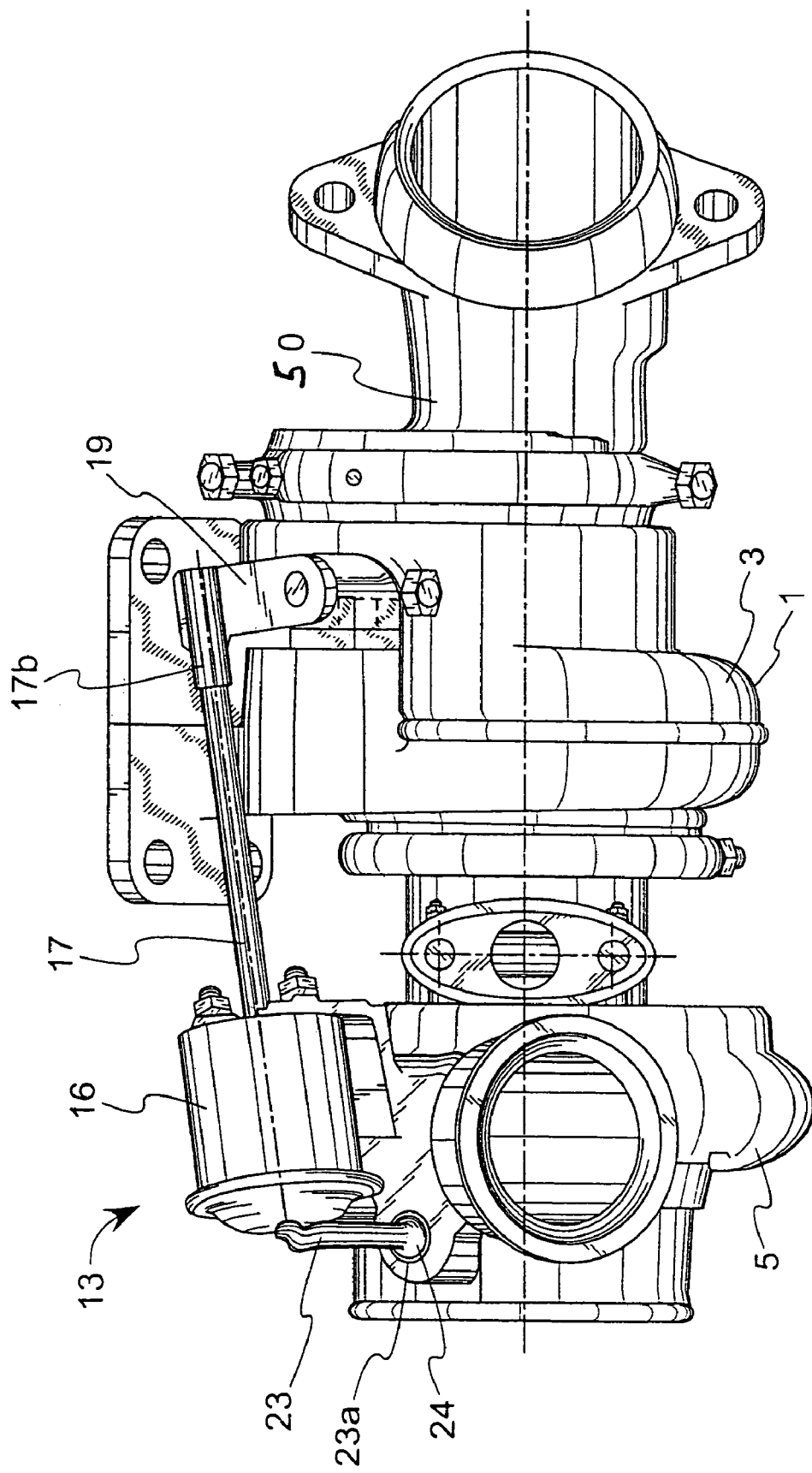
FIG. 3 is a side view of the turbocharger of FIG. 1 in the direction of arrow A on FIG. 1.

The actuator rod 17 is linked to the valve 12 via a lever arm 19 which is attached to the end of a valve stem 20 which passes through a bush 21 provided within the turbine housing 3. The actuator rod 17 is provided with a spherical rod end joint 17a, 17b at its end (shown partly cut-away in FIGS. 1 and 2 to reveal detail) which is connected to the lever arm 19. In the position shown in FIGS. 1 and 2, with the diaphragm biased towards the back of the actuating can 16, it will be seen that the valve member 12a is in a closed position.

In use, the wastegate valve 12 will, in low boost conditions, be held closed by the action of the spring 18 on the diaphragm 15 which is connected to the actuator rod 17. However, once the pressure in the compressor outlet volute 14 reaches a predetermined limit, the pressurised air transmitted to the actuator 13 via the connecting pipe 23 will push the diaphragm 15 against the action of the spring 18 thereby opening the wastegate valve to allow inlet exhaust gas to bypass the turbine. In this way, the maximum boost pressure produced by the turbocharger can be controlled and limited.

Returning now to the spherical rod end joint, this comprises a spherical actuator rod end 17a and a cylindrical rod end piece 17b which provides a socket for the spherical rod end 17a and which is welded to the lever arm. The spherical rod end joint 17a/17b provides for relative movement between the actuator rod 17 and the lever arm so that the actuator rod 17 maintains its alignment with the actuator can as it reciprocates back and forth. The spherical rod end joint also obviates the need to provide an adjustable length actuator rod 17, and enables a simplified set up procedure, as described below.

Since the spherical rod end joint 17a/17b provides for the necessary pivotable movement between the actuator rod 17 and the lever arm 19, no separate pivotal joint needs to be made between the lever arm 19 and the end piece 17b of the actuator rod. Rather, the lever arm is simply welded to both the wastegate valve stem and the end of the actuator rod (i.e. the end piece 17b). In contrast to the known weld to set methods described above, the lever arm 19 in accordance with the present invention is pre-assembled together with the wastegate valve rather than as part of the actuator assembly. The lever arm 19 is attached to the valve stem 20 before the actuator is mounted to the turbocharger.

To set the lift off point, the valve is clamped shut and the pressure in the actuator increased to the desired lift off pressure. However, in contrast to known methods, with the present invention it is not necessary to gain internal access to the turbine inlet to clamp the valve shut, rather the valve can be held shut by appropriate clamping of the lever arm 19 which is already connected to the valve stem. With the valve thus clamped in the closed position, the end piece 17b of the actuator rod 17 is located within a part cylindrical portion 19a of the lever arm 19 and the two are welded together at two points. It will be appreciated that there is therefore no need to provide an adjustable length actuator rod 17 since the effective length of the actuator rod is automatically determined at set up before the rod is welded to the lever arm 19 simply by positioning the rod end piece 17b on the lever arm 19. Variations in spring rates will simply mean that the exact position of the lever arm 19 along the axis of the actuator rod 17 may vary from one turbocharger to the next.

Clearly, positioning of the lever arm 19 on the valve stem 20 will have to be in a predetermined location to ensure that it extends in the correct orientation to receive the end of the actuator rod 17, but a certain amount of tolerance will be allowed for by the pivotal freedom of the spherical rod end joint. Similarly, the spherical rod end joint will allow for any slight misalignment of the actuator rod 17 as a result of any variation in the exact positioning of the actuator can on the bracket 25. The degree of freedom of movement provided by the spherical rod end joint does not have any adverse affect of the operation of the actuator, since with the valve closed the rod 17 is in tension.

It will therefore be appreciated that the setting operation in accordance with the present invention has advantages over the prior art weld to set methods, particularly in that the valve can be held in a closed position by a clamp applied to a lever arm external of the turbine housing, and that there is no need to adjust the length of the actuator rod prior to making the weld.

It will be appreciated that various modifications could be made to the embodiment of the invention described above. For instance, alternative forms of pivotable joint could be used in place of the spherical rod end joint 17a and 17b. Although preferably the joint should allow movement in orthogonal directions (to take account of any misalignment of the rod due to inaccurate positioning of the actuator can) if the actuator can is positioned accurately the joint need only be capable of pivoting in a single plane. Thus a straight forward pivotal or hinge joint could be used in place of the spherical rod end joint.

Other possible modifications will be evident to the appropriately skilled person.

Having thus described the invention, what is claimed as novel and desired to be secured by Letters Patent of the United States is:

1. A method of assembling a pressure control assembly of a turbocharger, the turbocharger comprising a turbine housing and a compressor, the pressure control assembly comprising a valve assembly mounted within the turbine housing, a pneumatic actuator mounted to the turbocharger to receive pressurised air from the compressor, an actuator rod extending from the pneumatic actuator, and a lever arm extending from the valve assembly and the turbine housing and linking the actuator rod to the valve assembly, wherein the actuator rod is a rod comprising a first elongate portion defining a first rod end, and a second portion defining a second rod end, said first and second portions being pivotally joined to one another to allow a degree of relative pivotal motion between said two portions in at least one plane containing the axis of said elongate first portion, the method comprising:
    assembling the valve assembly and lever arm on the turbine housing;
    assembling the pneumatic actuator and actuator rod as a sub-assembly;
    mounting the pneumatic actuator/actuating rod sub-assembly to the turbocharger; and
    securing the second portion of the actuator rod to the lever arm;
    wherein the actuator rod is secured to the lever arm by welding or otherwise bonding.

2. The method according to claim 1, wherein prior to securing the actuator rod to the lever arm, the valve assembly is held in a closed position by appropriate clamping of the lever arm and said pneumatic actuator is pressurised to a predetermined pressure, thereby to determine the minimum pressure at which said valve will in use begin to open.

3. The method according to claim 1, wherein said first and second portions of the actuator rod are pivotally joined to one another to allow a degree of relative motion between the two in at least two orthogonal planes containing the axis of said first portion.

4. An actuator rod for a turbocharger pressure control assembly, the actuator rod comprising a first elongate portion defining a first rod end, and a second portion defining a second rod end, said first and second portions being pivotally joined to one another to allow a degree of relative pivotal motion between said two portions in at least two orthogonal planes containing the axis of said elongate first portion.

5. The apparatus as claimed in claim 4, wherein the pivotal joint is a spherical joint.

6. The apparatus as claimed in claim 5, wherein said spherical joint comprises a spherical formation defined by one of said first and second portions, and a socket defined by the other of said first and second portions to receive said spherical formation.

7. The apparatus as claimed in claim 4, further comprising a pneumatic actuator connected to said first rod end.

8. The apparatus as claimed in claim 7, wherein the pneumatic actuator comprises a spring loaded diaphragm housed within a pressure chamber, said diaphragm being attached to said first rod end.

9. The apparatus as claimed in claim 4, further comprising a valve assembly, end of said actuating rod being connected to said actuator and the other end being connected to said valve assembly, whereby the pneumatic actuator controls operation of the valve assembly via the actuator rod.

10. The apparatus as claimed in claim 4, wherein the valve assembly further comprises a lever arm extending from and connected to a valve, and second portion of the actuator rod being secured to said lever arm extending from the valve assembly by way of which the valve is operated.

11. An apparatus comprising:
    an actuator rod for a turbocharger pressure control assembly, the actuator rod comprising a first elongate portion defining a first rod end, and a second portion defining a second rod end, said first and second portions being pivotally joined to one another to allow a degree of relative pivotal motion between said two portions in at least one plane containing the axis of said elongate first portion; and a lever arm fixedly connected to said second portion of the actuator rod;

wherein the pivotal joint between said first and second portions allows pivotal motion in at least two orthogonal planes containing the axis of said first elongate portion.

12. The apparatus as claimed in claim 11, wherein the pivotal joint is a spherical joint.

13. The apparatus as claimed in claim 12, wherein said spherical joint comprises a spherical formation defined by one of said first and second portions, and a socket defined by the other of said first and second portions to receive said spherical formation.

14. The apparatus as claimed in claim 11, further comprising a pneumatic actuator connected to said first rod end.

15. The apparatus as claimed in claim 14, wherein the pneumatic actuator comprises a spring loaded diaphragm housed within a pressure chamber, said diaphragm being attached to said first rod end.

16. The apparatus as claimed in claim 11 further comprising a valve assembly, end of said actuating rod being connected to said actuator and the other end being connected to said valve assembly, whereby the pneumatic actuator controls operation of the valve assembly via the actuator rod.

17. The apparatus as claimed in claim 16, wherein the valve assembly further comprises a lever arm extending from and connected to a valve, said second portion of the actuator rod being secured to said lever arm extending from the valve assembly by way of which the valve is operated.

* * * * *